(12) United States Patent
Frey et al.

(10) Patent No.: US 10,794,225 B2
(45) Date of Patent: Oct. 6, 2020

(54) TURBINE WITH SUPERSONIC SEPARATION

(71) Applicant: UOP LLC, Des Plaines, IL (US)

(72) Inventors: Stanley Joseph Frey, Palatine, IL (US); Michael Van de Cotte, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 239 days.

(21) Appl. No.: 15/923,990

(22) Filed: Mar. 16, 2018

(65) Prior Publication Data

US 2019/0284960 A1 Sep. 19, 2019

(51) Int. Cl.
*F01D 15/10* (2006.01)
*F01D 25/32* (2006.01)
*B01D 5/00* (2006.01)
*F01K 17/02* (2006.01)

(52) U.S. Cl.
CPC ........... *F01D 25/32* (2013.01); *B01D 5/0057* (2013.01); *F01D 15/10* (2013.01); *F01K 17/02* (2013.01); *F05D 2220/31* (2013.01); *F05D 2220/62* (2013.01); *F05D 2220/76* (2013.01); *F05D 2260/14* (2013.01)

(58) Field of Classification Search
CPC .......... F01D 25/32; F01D 15/10; F01K 11/02; F01K 23/064
See application file for complete search history.

(56) References Cited

U.S. PATENT DOCUMENTS

| 4,285,481 | A |   | 8/1981 | Biscomb | |
|---|---|---|---|---|---|
| 4,292,050 | A | * | 9/1981 | Linhardt | B01D 45/16 55/434.4 |
| 4,455,614 | A |   | 6/1984 | Martz et al. | |
| 5,167,123 | A | * | 12/1992 | Brandon | F01D 25/14 165/47 |
| 5,306,330 | A | * | 4/1994 | Nasikas | B01D 53/26 95/267 |
| 5,384,489 | A |   | 1/1995 | Bellac | |
| 6,009,711 | A |   | 1/2000 | Kreiger et al. | |
| 6,261,055 | B1 | * | 7/2001 | Owczarek | F01D 1/02 415/148 |
| 6,265,453 | B1 |   | 7/2001 | Kennedy | |

(Continued)

FOREIGN PATENT DOCUMENTS

| CN | 102203780 A | 9/2011 |
|---|---|---|
| CN | 103917280 A | 7/2014 |

(Continued)

OTHER PUBLICATIONS

International Search Report from corresponding PCT application No. PCT/US2019/022436, dated Jun. 20, 2019.

(Continued)

*Primary Examiner* — Woody A Lee, Jr.

(57) ABSTRACT

A turbine with a supersonic separator disposed upstream of the turbine. The supersonic separator imparts a swirl on a vapor stream to remove any heavier components. A superheated vapor stream from the supersonic separator is passed through the turbine to reduce the pressure of the vapor stream. At the same time, electricity is generated by the superheated vapor stream via a turbine wheel. The turbine and the supersonic separator can be integrally formed, or they can be discrete components.

18 Claims, 2 Drawing Sheets

(56) References Cited

U.S. PATENT DOCUMENTS

Figure 1:
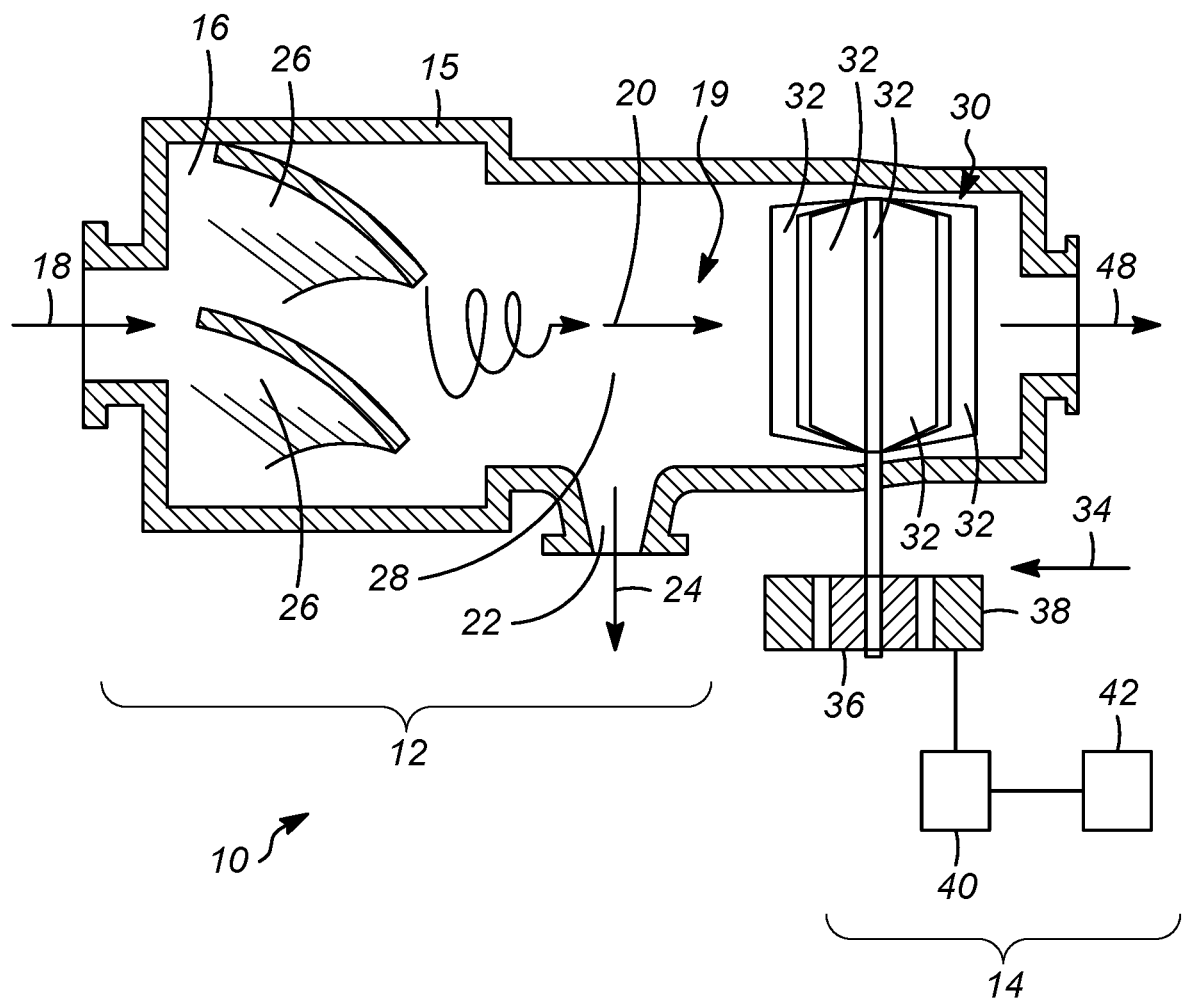

| | | | |
|---|---|---|---|
| 6,280,502 B1 * | 8/2001 | van Veen | B01D 5/0021 55/396 |
| 6,354,084 B1 | 3/2002 | McKinley et al. | |
| 6,681,155 B1 | 1/2004 | Fujita et al. | |
| 6,898,540 B2 | 5/2005 | Davies | |
| 6,962,199 B1 | 11/2005 | Tjeenk Willink | |
| 7,261,766 B2 | 8/2007 | Betting et al. | |
| 7,318,849 B2 | 1/2008 | Betting et al. | |
| 7,494,535 B2 | 2/2009 | Betting et al. | |
| 7,757,493 B2 | 7/2010 | Bell et al. | |
| 7,909,312 B2 | 3/2011 | Ogata | |
| 7,948,101 B2 | 5/2011 | Burtch | |
| 8,257,458 B2 | 9/2012 | Betting et al. | |
| 8,398,734 B2 | 3/2013 | Tjeenk Willink et al. | |
| 8,404,918 B2 | 3/2013 | Frey | |
| 8,475,555 B2 | 7/2013 | Betting et al. | |
| 8,510,015 B2 | 8/2013 | Beausoleil et al. | |
| 8,657,930 B2 | 2/2014 | Betting et al. | |
| 8,763,625 B1 | 7/2014 | Carter | |
| 8,967,590 B2 | 3/2015 | Minervini et al. | |
| 9,034,082 B2 | 5/2015 | Betting et al. | |
| 9,085,499 B2 | 7/2015 | Frey et al. | |
| 9,235,228 B2 | 1/2016 | Gazit et al. | |
| 9,764,272 B2 | 9/2017 | Martin et al. | |
| 2002/0036430 A1 * | 3/2002 | Welches | F02G 1/043 307/18 |
| 2005/0034463 A1 | 2/2005 | Simpson et al. | |
| 2008/0015839 A1 | 1/2008 | Noureldin et al. | |
| 2009/0125152 A1 | 5/2009 | Skowronski et al. | |
| 2011/0077448 A1 | 3/2011 | Frey | |
| 2011/0100004 A1 | 5/2011 | Al-Mazeedi | |
| 2011/0296869 A1 * | 12/2011 | Buhrman | B01D 45/12 62/617 |
| 2012/0107227 A1 | 5/2012 | Fischer et al. | |
| 2012/0118526 A1 | 5/2012 | Sudau et al. | |
| 2012/0227440 A1 | 9/2012 | Guidati et al. | |
| 2012/0245754 A1 | 9/2012 | Mehnert | |
| 2012/0260667 A1 | 10/2012 | Chillar et al. | |
| 2012/0326443 A1 | 12/2012 | Vince et al. | |
| 2013/0199185 A1 | 8/2013 | Wain et al. | |
| 2014/0331672 A1 | 11/2014 | Filippi et al. | |
| 2015/0118131 A1 | 4/2015 | Martin et al. | |
| 2016/0079756 A1 | 3/2016 | Ikeyama et al. | |
| 2016/0141878 A1 | 5/2016 | Johansen | |
| 2016/0161536 A1 | 6/2016 | Amminudin | |
| 2016/0252015 A1 | 9/2016 | Kusumi et al. | |
| 2016/0319198 A1 | 11/2016 | Quanci et al. | |
| 2016/0369654 A1 * | 12/2016 | Fukushima | F01D 5/12 |
| 2017/0058206 A1 | 3/2017 | Noureldin et al. | |
| 2017/0058207 A1 | 3/2017 | Noureldin et al. | |
| 2017/0140480 A1 * | 5/2017 | Seely | G06Q 10/06 |

FOREIGN PATENT DOCUMENTS

| | | |
|---|---|---|
| CN | 104463341 A | 3/2015 |
| CN | 206538206 | 10/2017 |
| EP | 0552039 | 7/1993 |
| EP | 2778354 A1 | 9/2014 |
| FR | 2414162 | 8/1979 |
| RU | 2014114067 | 10/2015 |
| WO | 2014119569 A1 | 8/2014 |
| WO | 2014178079 A2 | 11/2014 |
| WO | 2016004014 A1 | 1/2016 |
| WO | 2016177376 A1 | 11/2016 |

OTHER PUBLICATIONS

Guitiérrez-Antonio, Claudia, et al, Intensification of the hydrotreating process to produce renewable aviation fuel through reactive distillation, Science Direct, vol. 124, Feb. 2018.

Mohammadzadeh, Ashkan, et al., Design of a wind turbine model for clean energy. Case study: Khorasan Razavi regional electricity company, Acta Technica, 62, No. 4B/2017-1-8.

Hawkins, LA, et al., Development of 125Kw AMB Expander/Generator for Waste Heat Recovery, J. of Engineering for Gas Turbines and Power, Jul. 2011, 133, p. 072503-1 to 6.

Frey, Stanley J., et al., U.S. Appl. No. 62/644,086, filed Mar. 16, 2018 and entitled "System for Consolidation and Use of Power Recovered from a Turbine in a Process Unit".

Frey, Stanley J., et al., U.S. Appl. No. 62/644,104, filed Mar. 16, 2018 and entitled "System for Power Recovery from Quench and Dilution Vapor Streams".

Frey, Stanley Joseph, et al., U.S. Appl. No. 15/924,037, filed Mar. 16, 2018 and entitled "Power Recovery from Quench and Dilution Vapor Streams".

Frey, Stanley J., U.S. Appl. No. 15/923,936, filed Mar. 16, 2018 and entitled "Energy-Recovery Turbines for Gas Streams".

Frey, Stanley J., et al., U.S. Appl. No. 15/923,945, filed Mar. 16, 2018 and entitled "Consolidation and Use of Power Recovered from a Turbine in a Process Unit".

Frey, Stanley J., et al., U.S. Appl. No. 15/923,964, filed Mar. 16, 2018 and entitled "Process Improvement through the Addition of Power Recovery Turbine Equipment in Existing Processes".

Frey, Stanley Joseph, et al., U.S. Appl. No. 15/923,978, filed Mar. 16, 2018 and entitled "Hydroprocessing Unit with Power Recovery Turbines".

Harris, James W., et al., U.S. Appl. No. 15/923,995, filed Mar. 16, 2018 and entitled "Steam Reboiler with Turbine".

Harris, James W., et al., U.S. Appl. No. 15/924,034, filed Mar. 16, 2018 and entitled "Use of Recovered Power in a Process".

Frey, Stanley Joseph, et al., U.S. Appl. No. 15/923,997, filed Mar. 16, 2018 and entitled "Processes for Adjusting at Least One Process Condition of a Chemical Processing Unit with a Turbine".

Tsourapas, Vasilios, Control Analysis of Integrated Fuel Cell Systems with Energy Recuperation Devices, 2007.

The Elliot Group, Maximize the Efficiency of your Steam Process, 2014.

U.S. Department of Energy, Replace Pressure-Reducing Valves with Backpressure Turbogenerators.

Mechanical Solutions, Inc., Replacing a Pressure Reducing Valve with a Hydro Turbine for a Municipal Water Supply, Jul. 19, 2016.

* cited by examiner

TURBINE WITH SUPERSONIC SEPARATION

FIELD OF THE INVENTION

This invention relates generally to a turbine used in vapor stream in a chemical processing or refining plant, and more particularly to a turbine used with a vapor stream that is at or near its dew point.

BACKGROUND OF THE INVENTION

Chemical refining and processing methods frequently involve gaseous or vapor streams that are passed through control valves. The control valves are used to control the flow, upstream or downstream pressure, temperatures, or levels, etc. In the control valve, mechanical energy is dissipated. Since the energy is dissipated, without recovery, the energy is lost.

Moreover, the lost energy is often associated with energy added to the system. Thus, there is an inherent inefficiency in the process associated with supplying energy only to remove it without recovery. However, since the costs of supply in the energy are typically relatively small compared to the cost of recovering it instead of dissipating it, refiners and processors often operate the processing/refining unit with this inefficiency to maintain throughput of the processing/refining unit at minimal investment and operating complexity. Nevertheless, this inefficiency is an opportunity for processors to lower operating costs and, thus increase profits.

It has recently been discovered by the applicant that the control valves can be replaced with turbines to address these problems at scales smaller than have been possible in the past. Two things are making the smaller scale turbines more feasible. First, for example, devices such as discussed in Hawkins, L A; et al, Development of 125 kW AMB Expander/Generator for Waste Heat Recovery, *J. of Engineering for Gas Turbines and Power*, July 2011, 133, Pg 072503-1 to 6 show that designs using magnetic bearings and employing other compact design techniques can greatly reduce the cost and size of a turbine to the point of being economically applicable on a scale of <150 kW. Second, many chemical plant operators are seeing new regulatory and economic drivers towards energy recovery as governments either incent or compel chemical plants and refineries to reduce their net energy consumption. So, replacing control valves with turbines is being driven from both the improving turbine generator technology and improved economics for generating power.

In some applications within the processing unit, the turbine could potentially be problematic. Specifically, in a vapor stream at or near its dew point, when the vapor stream passes through the turbine and its pressure is reduced, the resultant vapor stream will partially condense forming a two-phase stream as a result of the cooling of expansion of the vapor. While there are currently turbines that are designed to accommodate the two-phase stream, such turbines are complicated in design and difficult to predict in operation.

Therefore, there is a need for an effective and efficient device and process for utilizing a turbine with a vapor stream that is near its dew point that is simpler and provides a more consistent output.

SUMMARY OF THE INVENTION

The present invention attempts to overcome one or more shortcomings discussed above. Specifically, according to the present invention, upstream of the turbine is a supersonic separator which separates out the heavier components before the vapor stream is passed to the turbine. The supersonic separator imparts a swirl at sonic or supersonic velocity to the vapor which condenses some of the heavier compounds into droplets. The droplets are separated from the remaining vapor phase components which are then passed to the turbine for a pressure reduction while generating electricity.

Furthermore, the turbine is able to provide information about the amount of energy removed. This information may be utilized to in determining adjustments for various processing conditions which reduce the amount of energy added to the process. This permits the processor to more efficiently operate the processing unit without reducing the throughput of the processing unit.

Therefore, the present invention may be characterized, in at least one aspect, as providing a process for recovering power from a vapor stream with a turbine by: condensing a portion of the vapor stream in a supersonic separation device, the separation supersonic device configured to impart a swirl at or above a sonic velocity on the vapor stream passing therethrough; separating the condensed portion from the vapor stream with the supersonic separation device to provide a superheated vapor stream; and, recovering power from the superheated vapor stream in a turbine, the turbine comprising a turbine wheel configured to transmit rotational movement to an electrical generator.

In another aspect, the present invention may be generally characterized as providing a process for recovering power from a vapor stream with a turbine by: passing a vapor stream to a supersonic separation device, the supersonic separation device configured to impart a swirl at or above a sonic velocity on the vapor stream passing therethrough; separating a condensed portion of the vapor stream with the supersonic separation device to provide a superheated vapor stream; passing the superheated vapor stream to a turbine, the turbine comprising a turbine wheel configured to transmit rotational movement to an electrical generator; rotating the turbine wheel with the superheated vapor stream; and, generating electricity with the electrical generator.

The present invention, according to yet another aspect, may be characterized as providing an apparatus for generating electricity which includes: a body with an inlet configured to receive a vapor stream, a first outlet for a superheated vapor stream and, a second outlet for a liquid stream; a baffle disposed within the body and configured to impart a swirl at or above sonic velocity to the vapor stream; an internal cavity in the body between the inlet, the first outlet, and the second outlet; and, a turbine wheel configured to transmit rotational movement from the superheated vapor stream to an electrical generator, the turbine wheel disposed between the outlet and the internal cavity.

Additional aspects, embodiments, and details of the invention, all of which may be combinable in any manner, are set forth in the following detailed description of the invention.

DETAILED DESCRIPTION OF THE DRAWING

Figure 2:
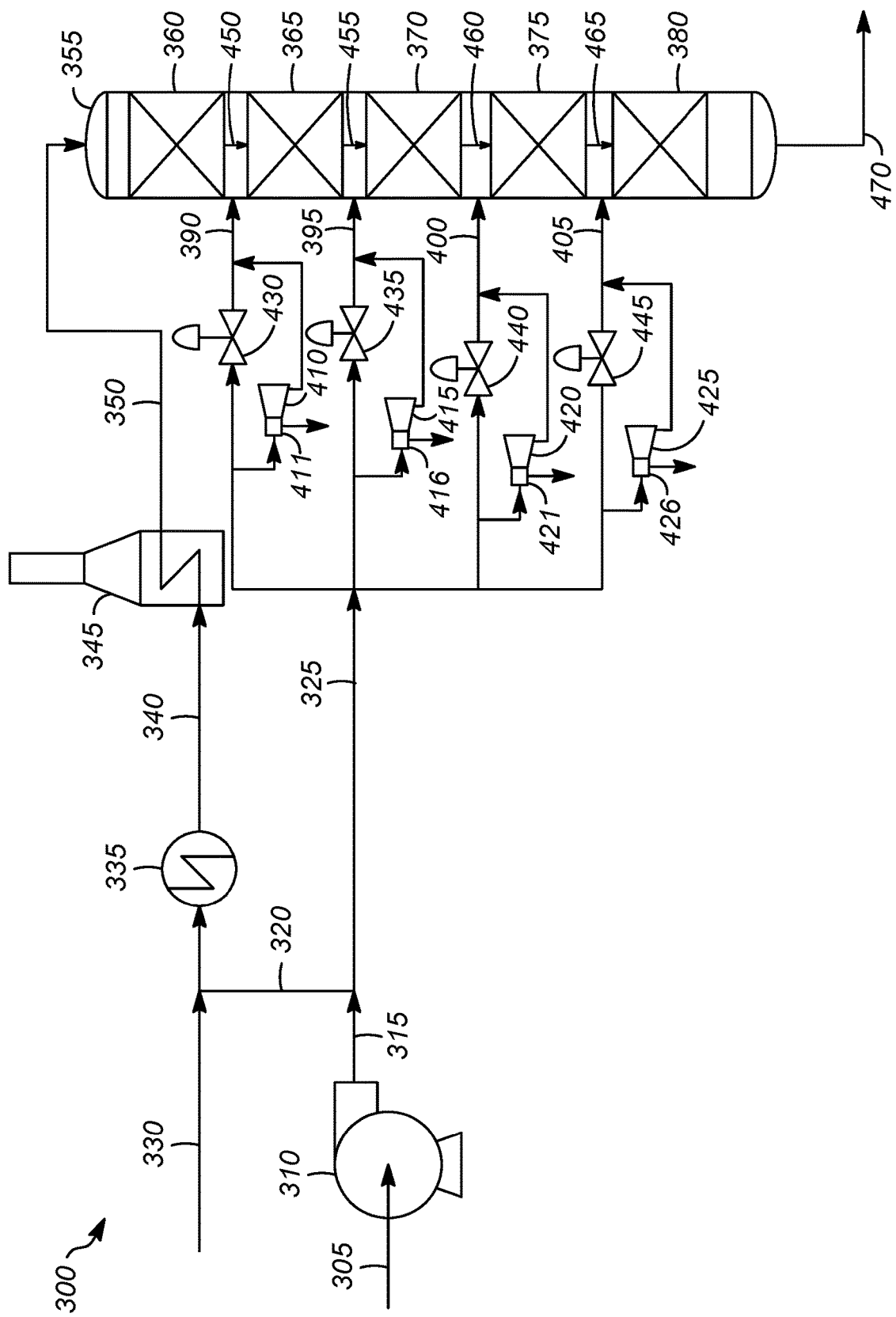

One or more exemplary embodiments of the present invention will be described below in conjunction with the attached drawing in which:

FIG. 1 depicts a partial cutaway schematic view of a device according to the present invention; and, FIG. 2 depicts a hydroprocessing unit according to one or more embodiments of the present invention.

DETAILED DESCRIPTION OF THE INVENTION

As mentioned above, the present invention provides a supersonic separating device upstream of a turbine. The supersonic separating device condenses a portion of a vapor stream that is at or near its due point. The remaining vapor portion, a superheated stream as a result of the heavier compounds being removed, is passed through the turbine, allowing the pressure to be reduced. The turbine generates electricity from this energy dissipation which is recovered or used elsewhere in the processing unit. The reduced pressure vapor stream is less likely to be a two-phase system and can be used as desired in the process unit.

With these general principles in mind, one or more embodiments of the present invention will be described with the understanding that the following description is not intended to be limiting.

An exemplary device 10 according to the present invention is shown in FIG. 1. The device 10 is used for generating electricity and a vapor stream with a lower pressure. The device 10 includes a supersonic separator 12 and a turbine 14. It is contemplated that the supersonic separator 12 and the turbine 14 are integrally formed as a single unit, i.e., the two are contained within a single body 15 (or housing) and are not connected to each other with any external conduits. This is merely a preferred configuration, and it is contemplated that the advantages and benefits of the present invention are achieved with the supersonic separator 12 and the turbine 14 being discrete components as opposed to a single unit.

The particular configuration of the supersonic separator 12 is not necessarily important for the practicing of the present invention. Exemplary supersonic separators 12 are disclosed in U.S. Pat. Nos. 6,962,199, 7,261,766, 7,318,849, 7,494,535, 8,257,458, 8,398,734, 7,909,912, 8,475,555, 8,657,930, and 9,034,082, all of which are incorporated herein by reference.

Generally, the supersonic separator 12 comprises an inlet 16 configured to receive a vapor stream 18, a first outlet 19 for a superheated vapor stream 20 and, a second outlet 22 for a liquid stream 24. Accordingly, in processes according to the present invention, the vapor stream 18 is at or near its dew point. Thus, the vapor stream 18 could be within 10° C. of a dew point of the vapor stream 18, within 5° C. of a dew point of the vapor stream 18, within 1° C. of a dew point of the vapor stream 18, or greater than the dew point of the vapor stream 18 but less than 1° C. from the dew point of the vapor stream 18. For example, the vapor stream 18 includes hydrogen gas and light hydrocarbons, hydrogen sulfide, ammonia, and water. By light hydrocarbons it is meant that the hydrocarbons in the vapor stream 18 comprise between one and six carbon atoms.

Within the supersonic separator 12 one or more baffles 26 impart a swirl at or above sonic velocity to the vapor stream 18. Downstream of the baffle(s) 26 the supersonic separator 12 includes an internal cavity 28. As is known in the art, within the internal cavity 28, the swirling vapor stream causes the larger molecules and compounds within the swirling vapor stream to condense together for form droplets. The droplets separate from the vapor and are recovered as the liquid stream 24 from the supersonic separator 12 via the second outlet 22.

Downstream of the internal cavity 28, the vapor is a superheated vapor stream 20 that is passed to the turbine 14. The superheated vapor stream 20 has the same, or approximately the same temperature as the vapor stream 18. Depending on the composition of the vapor stream 18, the superheated vapor stream 20 may or may not have a different chemical composition than the vapor stream 18. It is contemplated that the superheated vapor stream 20 has at least 2° C. more superheat the vapor stream 18. The superheated vapor stream 20 is passed to the turbine 14 for a pressure reduction and to generate electricity.

The particular configuration of the turbine 14 is not necessarily important for the practicing of the present invention. Exemplary turbines 14 are disclosed in U.S. Pat. Nos. 4,625,125, 4,694,189, 4,754,156, and 9,203,269 all of which are incorporated herein by reference.

Generally, the turbine 14 includes a turbine wheel 30 with blades 32 configured to transfer, or transmit, rotational movement, created by the flow of a fluid stream passing the turbine wheel 30, to an electrical generator 34. The electrical generator 34 generally includes a first winding 36, in communication with the turbine wheel 30 and a second winding 38 surrounding the first winding 36 and stationary with respect to the first winding 36. As will be appreciated, the rotation of the first winding 36 creates an electrical current in the second winding 38. Additionally, the turbine 14 may include a processor 40 configured to measure an amount of electricity generated by the turbine 14 and a transmitter 42 configured to transmit information associated with the amount of electricity generated by the turbine 14 to a computer 44 at a control center 46 for the processing unit (discussed in more detail below).

Within the turbine 14, the superheated vapor stream 20 passing therethrough will rotate the turbine wheel 30 and, as is known, generate electricity via the electrical generator 34. At the same time the pressure of the superheated vapor stream 20 is reduced to provide a low pressure vapor stream 48 having a pressure that is less than the superheated vapor stream 20 (and the vapor stream 18). By utilizing the supersonic separator 12 before the turbine 14, the low pressure vapor stream 48 is less likely to be two-phase—even though the vapor stream 18 was at or near its dew point. Additionally, unlike processes which utilize control valves for the pressure reduction, the present invention provides for the conversion of some of the energy removed via the pressure reductions to electricity.

Accordingly, in some embodiments, the process according to the present invention comprises directing a portion of a gaseous process stream through one or more variable-resistance turbines to control the flowrate of the gas process stream and, optionally, generate electric power therefrom; controlling a pressure and temperature of the gaseous process stream so that the gas exiting the power-recovery turbine remains in the gas phase; and measuring the flowrate or controlling the flowrate or both using a variable nozzle turbine, inlet variable guide vanes, or direct coupled variable electric load, to name a few, to vary the resistance to flow through the turbine. Again, the resistance to rotation of the variable-resistance turbine can be varied by an external variable load electric circuit which is in a magnetic field from a magnet(s) that is rotating on the turbine. As more load is put on the circuit, there is more resistance to rotation on the turbine. This in turn imparts more pressure drop across the turbine and slows the process stream flow. An algorithm in the device can also calculate the actual flow through the device by measuring the turbine RPMs and the load on the circuit. The resistance to rotation flow can also be varied by variable position inlet guide vanes. In some embodiments, the power will be generated via power-recovery turbines with variable resistance to flow made possible by either guide vanes or variable load on the electrical power generation circuit. An algorithm to calculate actual flow using the guide vanes position, power output and RPMs can be used.

If slow control response of the turbine is an issue then the use of the turbine is limited to slow responding or "loose" control point applications. A slow responding application is contemplated to have a response time to reach half way (i.e., 50% of a difference) between a new (or target) steady state condition (e.g., temperature, pressure, flow rate) from an original (or starting) steady state condition when the new (or target) condition differs from the original (or stating) condition of at least 10%, is of at least one second, or even greater, for example, ten seconds, at least one minute, at least ten minutes, or an hour or more, for half of the change to completed.

Turning to FIG. 2, another embodiment of the present invention is shown in relation to a hydroprocessing unit 300. In the depicted embodiment, hydrogen stream 305 is compressed in compressor 310. The compressed hydrogen stream 315 is split into first and second portions, hydrogen streams 320 and 325. First hydrogen stream 320 is mixed with the hydrocarbon feed stream 330 and sent through heat exchanger 335 to raise the temperature. The partially heated feed stream 340 is sent to fired heater 345 to raise the temperature of the feed stream 350 exiting the fired heater 345 to the desired inlet temperature for the hydroprocessing reaction zone 355.

Second hydrogen stream 325 is divided into four hydrogen quench streams 390, 395, 400, 405. Each of the hydrogen quench streams 390, 395, 400, 405 has a turbine 410, 415, 420, 425 configured to generate power and control the flow of hydrogen entering the hydroprocessing bed as well as a control valve 430, 435, 440, 445 to control the flow of hydrogen entering the hydroprocessing bed. The turbines 410, 415, 420, 425 each include a supersonic separator 411, 416, 421, 426 and thus may have the configuration shown in FIG. 1, discussed above.

Hydrogen quench streams 390, 395, 400, 405 can be directed through either the turbine 410, 415, 420, 425, the control valve 430, 435, 440, 445, or both.

For example, a first fraction of the second hydrogen stream 325 can be directed to the first supersonic separator 411 and turbine 410, and a second fraction can be directed to the control valve 430. The first fraction can vary from 0% to 100% and the second fraction can vary from 100% to 0%. The same applies to the remain fractions sent to the other control valves 435, 440, 445 and turbines 415, 420, 425 associated with supersonic separators 416, 421, 426. Thus, the flow of the hydrogen quench streams 390, 395, 400, 405 can be controlled by the turbines 410, 415, 420, 425, the control valves 430, 435, 440, 445, or both, allowing excellent process flexibility in systems including both. Additionally, by including the supersonic separators 411, 416, 421, 426, heavier compounds are more likely to be removed from the quench streams 390, 395, 400, 405 from the turbines 410, 415, 420, 425.

As shown, hydroprocessing reaction zone 355 has five hydroprocessing beds 360, 365, 370, 375, and 380. Feed stream 350, which contains hydrogen and hydrocarbon feed to be hydroprocessed, enters the first hydroprocessing bed 360 where it undergoes hydroprocessing. The effluent from the first hydroprocessing bed 360 is mixed with first hydrogen quench stream 390 to form first quenched hydroprocessed stream 450.

The first quenched hydroprocessed stream 450 is sent to the second hydroprocessing bed 365 where it undergoes further hydroprocessing. The effluent from the second hydroprocessing bed 365 is mixed with second hydrogen quench stream 395 to form second quenched hydroprocessed stream 455. The second quenched hydroprocessed stream 455 is sent to the third hydroprocessing bed 370 where it undergoes further hydroprocessing. The effluent from the third hydroprocessing bed 370 is mixed with third hydrogen quench stream 400 to form third quenched hydroprocessed stream 460. The third quenched hydroprocessed stream 460 is sent to the fourth hydroprocessing bed 375 where it undergoes further hydroprocessing. The effluent from the fourth hydroprocessing bed 375 is mixed with fourth hydrogen quench stream 405 to form fourth quenched hydroprocessed stream 465. The fourth quenched hydroprocessed stream 465 is sent to the fifth hydroprocessing bed 380 where it undergoes further hydroprocessing. The effluent 470 from the fifth hydroprocessing bed 380 can be sent to various processing zones, as described above.

Although not depicted as such, the effluent 470 typically is heat exchanged with the feed, passed to a water wash to extract and dissolve salts, air or water cooled with a condensing heat exchange, and subjected to a vapor liquid separation to provide a recycle gas and liquid—which is passed to subsequent stripping and distillative fractionation. The recycle gas stream would be amine treated to remove hydrogen sulfide, combined with make-up hydrogen before or after recompression in a recycle gas compressor and returned to the hydroprocessing reaction zone 355 via the combining with the reactor inlet hydrocarbon stream or as quench gas streams along the length of the reactor.

As will be appreciated, the chemical processing units used in the present processes, such as the hydroprocessing unit 300, utilize a process control system. The process control system described in connection with the embodiments disclosed herein may be implemented or performed on the computer with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, the processor may be any conventional processor, controller, microcontroller, or state machine. A processor may also be a combination of computing devices, e.g., a combination of a DSP and a microprocessor, two or more microprocessors, or any other combination of the foregoing.

The steps of the processes associated with the process control system may be embodied in an algorithm contained directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is in communication with the processor reading information from, and writing information to, the storage medium. This includes the storage medium being integral to or with the processor. The processor and the storage medium may reside in an ASIC. The ASIC may reside in a user terminal. Alternatively, the processor and the storage medium may reside as discrete components in a user terminal. These devices are merely intended to be exemplary, non-limiting examples of a computer readable storage medium. The processor and storage medium or memory are also typically in communication with hardware (e.g., ports, interfaces, antennas, amplifiers, signal processors, etc.) that allow for wired or wireless communication between different components, computers processors, or the like, such as between the input channel, a processor of the control logic, the output channels within the control system and the operator station in the control center.

In communication relative to computers and processors refers to the ability to transmit and receive information or data. The transmission of the data or information can be a wireless transmission (for example by Wi-Fi or Bluetooth) or a wired transmission (for example using an Ethernet RJ45 cable or an USB cable). For a wireless transmission, a wireless transceiver (for example a Wi-Fi transceiver) is in communication with each processor or computer. The transmission can be performed automatically, at the request of the computers, in response to a request from a computer, or in other ways. Data can be pushed, pulled, fetched, etc., in any combination, or transmitted and received in any other manner.

According to the present invention, therefore, it is contemplated that the process control system receives information relative to an amount of electricity generated by the turbines 14, 410, 415, 420, 425. It is contemplated that the turbine 14, 410, 415, 420, 425 determines the amount of electricity it has generated, or alternatively, the process control system receiving the information determines the amount of electricity that has been generated. In either configuration, the amount of the electricity generated by the turbines 14, 410, 415, 420, 425 is displayed on at least one display screen 50 (for example in communication with the computer 44 in the control center 46). If the processing unit comprises a plurality of turbines 14, 410, 415, 420, 425, it is further contemplated that the processing control system receives information associated with the amount of electricity generated by each of the turbines 14, 410, 415, 420, 425. The processing control system determines a total power generated based upon the information associated with the each of the turbines 14, 410, 415, 420, 425 and displays that the total power generated. The total power generated may be displayed instead of or in conjunction with the display of the power generated by individual turbines 14, 410, 415, 420, 425.

As discussed above, the recovery of the electricity is oftentimes based upon the need to remove energy from the streams that has already been added to the streams in the processing units. Thus, it is contemplated that the processes according to the present invention provide for the various processing conditions associated with the processing units to be adjusted into order to lower the energy added to the steam initially. It is contemplated that the process control system receives information associated with the throughput of the processing unit, and determines a target power generated value for the turbines 14, 410, 415, 420, 425, since the electricity represents energy that is typically added to the overall processing unit. The determination of the target power generated value may be done when the electricity is at or near a predetermined level. Thus, the process control system will analyze one or more changes to the various processing conditions associated with the processing unit to lower the amount of energy recovered by the turbines 14, 410, 415, 420, 425. Preferably, the processing conditions are adjusted without adjusting the throughput of the processing unit. This allows for the processing unit to have the same output, but with a lower operating input. The process control software may calculate and display the difference between the target power generated value and the total power generated on the at least one display screen 50.

It is contemplated that the process control system receives information associated with the throughput of the processing unit, and determines a target electrical power generated value for the turbine(s) 14, 410, 415, 420, 425 since the electricity represents energy that is typically added to the overall processing unit. The determination of the target electrical power generated value may be done when the electricity is at or near a predetermined level. In other words, if the amount of electricity produced meets or exceeds a predetermined level, the processing simulation system can determine one or more processing conditions to adjust and lower the amount of electricity generated until it reaches the target electrical power generated value.

Thus, the process simulation system will analyze one or more changes to the various processing conditions associated with the processing unit to lower the amount of energy recovered by the turbine 14, 410, 415, 420, 425. Preferably, the processing conditions are adjusted without adjusting the throughput of the processing unit. This allows for the processing unit to have the same throughput, but with a lower operating cost. The process simulation software may calculate and display the difference between the target electrical power generated value and the total electrical power generated on the at least one display screen 50.

For example, the process simulation software may determine that the total electrical power generated exceeds a predetermined level. Accordingly, the process simulation software determines the target electrical power generated value. Based upon other data and information received from other sensors and data collection devices typically associated with the processing unit, the process simulation software determines that the pressure provided by a compressor associated with the vapor stream can be lowered. While maintaining the throughput of the processing unit, an operating condition of the compressor is adjusted to provide a vapor stream 18 that still needs a pressure reduction in the turbine 14, 410, 415, 420, 425, but the difference between the two pressures is smaller. While this may lower the electricity generated by the turbine 14, 410, 415, 420, 425, the lower pressure for the compressor output requires less energy to achieve and provides a lower operating cost for the same throughput.

Thus, not only does the present invention reduce the chance that the low pressure vapor stream 48 is a two-phase stream, the processing units are provided with opportunities to lower the energy input associated with the overall processing unit and increase profits by utilizing more energy efficient processes.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Those of skill in the art will appreciate that the illustrative logical instruction, steps, blocks, modules, and circuits described in the present application may be implemented as electronic hardware, computer software, or combinations of both. Some of the embodiments and implementations are described herein based upon functional and/or logical block components (or modules) and various steps. However, those of ordinary skill in the art will appreciate that these steps and block components (or modules) may be realized by any number of hardware, software, and/or firmware components configured to perform the specified functions Thus, based upon the interchangeability of hardware and software, the various steps, components, blocks, modules, and circuits are described herein generally in terms of their functionality. Whether such functionality is implemented as hardware or software depends upon the any design constraints imposed on the overall system and can vary for each different application of the present invention. A person of ordinary skill in the art may implement this functionality in diverse ways for each particular application, but such implementation decisions should not be interpreted as causing a departure from the scope of the present invention.

SPECIFIC EMBODIMENTS

While the following is described in conjunction with specific embodiments, it will be understood that this description is intended to illustrate and not limit the scope of the preceding description and the appended claims.

A first embodiment of the invention is a process for recovering power from a vapor stream with a turbine, the process comprising condensing a portion of the vapor stream in a supersonic separation device, the supersonic separation device configured to impart a swirl at or above a sonic velocity on the vapor stream passing therethrough; separating the condensed portion from the vapor stream with the supersonic separation device to provide a superheated vapor stream; and, recovering power from the superheated vapor stream in a turbine, the turbine comprising a turbine wheel configured to transmit rotational movement to an electrical generator. An embodiment of the invention is one, any or all of prior embodiments in this paragraph up through the first embodiment in this paragraph, wherein the superheated vapor stream has at least 2° C. more superheat than the vapor stream. An embodiment of the invention is one, any or all of prior embodiments in this paragraph up through the first embodiment in this paragraph, wherein a temperature of the vapor stream is less than 10° C. above a dew point of the vapor stream. An embodiment of the invention is one, any or all of prior embodiments in this paragraph up through the first embodiment in this paragraph, wherein the temperature of the vapor stream is less than 5° C. above a dew point of the vapor stream. An embodiment of the invention is one, any or all of prior embodiments in this paragraph up through the first embodiment in this paragraph, wherein the vapor stream comprises hydrogen and light hydrocarbons. An embodiment of the invention is one, any or all of prior embodiments in this paragraph up through the first embodiment in this paragraph, wherein the condensed portion comprises the light hydrocarbons. An embodiment of the invention is one, any or all of prior embodiments in this paragraph up through the first embodiment in this paragraph wherein the supersonic separation device and the turbine are integral with each other.

A second embodiment of the invention is a process for recovering power from a vapor stream with a turbine, the process comprising passing a vapor stream to a supersonic separation device, the supersonic separation device configured to impart a swirl at or above a sonic velocity on the vapor stream passing therethrough; separating a condensed portion of the vapor stream with the supersonic separation device to provide a superheated vapor stream; passing the superheated vapor stream to a turbine, the turbine comprising a turbine wheel configured to transmit rotational movement to an electrical generator; rotating the turbine wheel with the superheated vapor stream; and, generating electricity with the electrical generator. An embodiment of the invention is one, any or all of prior embodiments in this paragraph up through the second embodiment in this paragraph, wherein the superheated vapor stream has at least 2° C. more superheat than the vapor stream. An embodiment of the invention is one, any or all of prior embodiments in this paragraph up through the second embodiment in this paragraph, wherein a temperature of the vapor stream is less than 10° C. above a dew point of the vapor stream. An embodiment of the invention is one, any or all of prior embodiments in this paragraph up through the second embodiment in this paragraph, wherein the temperature of the vapor stream is less than 5° C. above a dew point of the vapor stream. An embodiment of the invention is one, any or all of prior embodiments in this paragraph up through the second embodiment in this paragraph, wherein the vapor stream comprises hydrogen and light hydrocarbons. An embodiment of the invention is one, any or all of prior embodiments in this paragraph up through the second embodiment in this paragraph, wherein the condensed portion comprises the light hydrocarbons. An embodiment of the invention is one, any or all of prior embodiments in this paragraph up through the second embodiment in this paragraph wherein the supersonic separation device and the turbine are integral with each other. An embodiment of the invention is one, any or all of prior embodiments in this paragraph up through the second embodiment in this paragraph further comprising receiving information from the turbine relative to an amount of electricity generated by the turbine; and, displaying the amount of electricity generated by the turbine on at least one display screen. An embodiment of the invention is one, any or all of prior embodiments in this paragraph up through the second embodiment in this paragraph further comprising receiving information associated from a plurality of turbines relative to an amount of information generated by each of the turbines; determining a total amount of electricity generated by the turbines; and, displaying the total amount of electricity generated on the at least one display screen. An embodiment of the invention is one, any or all of prior embodiments in this paragraph up through the second embodiment in this paragraph, wherein the vapor stream is part of a processing unit, and the process further comprising receiving information associated with a throughput of the processing unit; and, determining a power generated target value based in part on the information associated with the throughput of the processing unit. An embodiment of the invention is one, any or all of prior embodiments in this paragraph up through the second embodiment in this paragraph further comprising maintaining the throughput of the processing unit while adjusting at least one process parameter of the processing unit based upon the power generated target value. An embodiment of the invention is one, any or all of prior embodiments in this paragraph up through the second embodiment in this paragraph, wherein the processing unit comprises a plurality of turbines each configured to generate electricity, and wherein the process comprises determining a total power generated based upon the amount of electricity generated by each of the turbines; and, displaying the total power generated on the at least one display screen.

A third embodiment of the invention is an apparatus for generating electricity, the apparatus comprising a body with an inlet configured to receive a vapor stream, a first outlet for a superheated vapor stream and, a second outlet for a liquid stream; a baffle disposed within the body and configured to impart a swirl at or above sonic velocity to the vapor stream;

an internal cavity in the body between the inlet, the first outlet, and the second outlet; and, a turbine wheel configured to transmit rotational movement from the superheated vapor stream to an electrical generator, the turbine wheel disposed between the outlet and the internal cavity.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for recovering power from a vapor stream with a turbine, the process comprising:
   condensing a portion of the vapor stream in a supersonic separator, the supersonic separator comprising a baffle configured to impart a swirl at or above a sonic velocity on the vapor stream passing therethrough;
   separating the condensed portion from the vapor stream with the supersonic separator to provide a superheated vapor stream; and,
   recovering power from the superheated vapor stream in a turbine, the turbine comprising a turbine wheel configured to transmit rotational movement to an electrical generator,
   wherein the supersonic separator comprises a body with an inlet for the vapor stream, an outlet for a liquid stream comprising the condensed portion from the vapor stream, and an outlet for the superheated vapor stream, and
   wherein the turbine is disposed within the body.

2. The process of claim 1, wherein the superheated vapor stream has at least 2° C. more superheat than the vapor stream.

3. The process of claim 1, wherein a temperature of the vapor stream is less than 10° C. above a dew point of the vapor stream.

4. The process of claim 3, wherein the temperature of the vapor stream is less than 5° C. above a dew point of the vapor stream.

5. The process of claim 1, wherein the vapor stream comprises hydrogen and light hydrocarbons.

6. The process of claim 5, wherein the condensed portion comprises the light hydrocarbons.

7. A process for recovering power from a vapor stream with a turbine, the process comprising:
   passing a vapor stream to a supersonic separator, the supersonic separator comprising a baffle configured to impart a swirl at or above a sonic velocity on the vapor stream passing therethrough;
   separating a condensed portion of the vapor stream with the supersonic separator to provide a superheated vapor stream;
   passing the superheated vapor stream to a turbine, the turbine comprising a turbine wheel configured to transmit rotational movement to an electrical generator;
   rotating the turbine wheel with the superheated vapor stream; and,
   generating electricity with the electrical generator,
   wherein the supersonic separator comprises a body with an inlet for the vapor stream, an outlet for a liquid stream comprising the condensed portion from the vapor stream, and an outlet for the superheated vapor stream, and
   wherein the turbine is disposed within the body.

8. The process of claim 7, wherein the superheated vapor stream has at least 2° C. more superheat than the vapor stream.

9. The process of claim 7, wherein a temperature of the vapor stream is less than 10° C. above a dew point of the vapor stream.

10. The process of claim 9, wherein the temperature of the vapor stream is less than 5° C. above a dew point of the vapor stream.

11. The process of claim 7, wherein the vapor stream comprises hydrogen and light hydrocarbons.

12. The process of claim 11, wherein the condensed portion comprises the light hydrocarbons.

13. The process of claim 7 further comprising:
   receiving information from the turbine relative to an amount of electricity generated by the turbine; and,
   displaying the amount of electricity generated by the turbine on at least one display screen.

14. The process of claim 13 further comprising:
   receiving information associated from a plurality of turbines relative to an amount of information generated by each of the turbines;
   determining a total amount of electricity generated by the turbines; and,
   displaying the total amount of electricity generated on the at least one display screen.

15. The process of claim 13, wherein the vapor stream is part of a processing unit, and the process further comprising:
   receiving information associated with a throughput of the processing unit; and,
   determining a power generated target value based in part on the information associated with the throughput of the processing unit.

16. The process of claim 15 further comprising:
   maintaining the throughput of the processing unit while adjusting at least one process parameter of the processing unit based upon the power generated target value.

17. The process of claim 15, wherein the processing unit comprises a plurality of turbines each configured to generate electricity, and wherein the process comprises:
   determining a total power generated based upon the amount of electricity generated by each of the turbines; and,
   displaying the total power generated on the at least one display screen.

18. An apparatus for generating electricity, the apparatus comprising:
- a body with an inlet configured to receive a vapor stream, a first outlet for a superheated vapor stream and, a second outlet for a liquid stream;
- a baffle disposed within the body and configured to impart a swirl at or above sonic velocity to the vapor stream;
- an internal cavity in the body between the inlet, the first outlet, and the second outlet; and,
- a turbine wheel configured to transmit rotational movement from the superheated vapor stream to an electrical generator, the turbine wheel disposed in the body between the outlet and the internal cavity.

* * * * *